United States Patent [19]
Yamashita

[11] Patent Number: 6,070,053
[45] Date of Patent: *May 30, 2000

[54] RADIO COMMUNICATION SYSTEM INCLUDING INDEPENDENT CALLING SOUND NOTIFICATION

[75] Inventor: Tomohisa Yamashita, Sagamihara, Japan

[73] Assignee: Kabushiki Kaisha Toshiba, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/946,328

[22] Filed: Oct. 7, 1997

[30] Foreign Application Priority Data

Oct. 7, 1996 [JP] Japan .................................. 8-266094

[51] Int. Cl.[7] ...................................................... G08B 3/00
[52] U.S. Cl. ........................ 455/31.1; 455/38.2; 455/38.5; 455/567
[58] Field of Search .................................. 455/31.1, 35.1, 455/36.1, 38.1, 38.2, 38.5, 567, 220, 227, 228; 340/825.49, 825.48

[56] References Cited

U.S. PATENT DOCUMENTS

| | | | |
|---|---|---|---|
| 4,330,780 | 5/1982 | Masaki | 340/825.44 |
| 4,419,668 | 12/1983 | Ganucheau, Jr. | 340/825.44 |
| 4,975,693 | 12/1990 | Davis et al. | 340/825.44 |
| 5,307,059 | 4/1994 | Connary et al. | 340/825.44 |
| 5,495,236 | 2/1996 | Minami | 340/825.44 |
| 5,721,537 | 2/1998 | Protas | 340/825.44 |
| 5,739,759 | 4/1998 | Nakazawa et al. | 340/825.44 |
| 5,754,111 | 5/1998 | Garcia | 340/825.44 |
| 5,815,081 | 9/1998 | Motohashi | 455/31.1 |

*Primary Examiner*—Daniel S. Hunter
*Assistant Examiner*—Thuan Nguyen
*Attorney, Agent, or Firm*—Limbach & Limbach L.L.P.

[57] ABSTRACT

In a radio communication system and radio communication apparatus, the ringing sound or melody of calling notification can be altered by users. A music data receiving section, a music data storage section and a music data reproducing section are provided within a controller. A calling party transmits a calling signal in which music data is appended to the message; a called party receives the calling signal through an antenna and radio section, where a music data receiving section is used to determine whether or not music data is contained in the received message in the calling signal, and, if it is contained, to perform ringing for calling notification with a speaker by using the music data.

10 Claims, 10 Drawing Sheets

\* : MESSAGE DATA

FIG.6(b)

MELODY HAS BEEN RECEIVED

— MUSICAL SCALE CODE
— RHYTHM (1 : YES, 0 : NO)
— HALF TONE (1 : YES, 0 : NO)

| MUSICAL SCALE | MUSICAL SCALE CODE |
|---|---|
| DO | 0 0 0 0 |
| RE | 0 0 0 1 |
| MI | 0 0 1 0 |
| FA | 0 0 1 1 |
| SO | 0 1 0 0 |
| LA | 0 1 0 1 |
| SI | 0 1 1 0 |
| DO | 0 1 1 1 |
| RE | 1 0 0 0 |
| MI | 1 0 0 1 |
| FA | 1 0 1 0 |
| SO | 1 0 1 1 |
| LA | 1 1 0 0 |
| SI | 1 1 0 1 |
| DO | 1 1 1 0 |

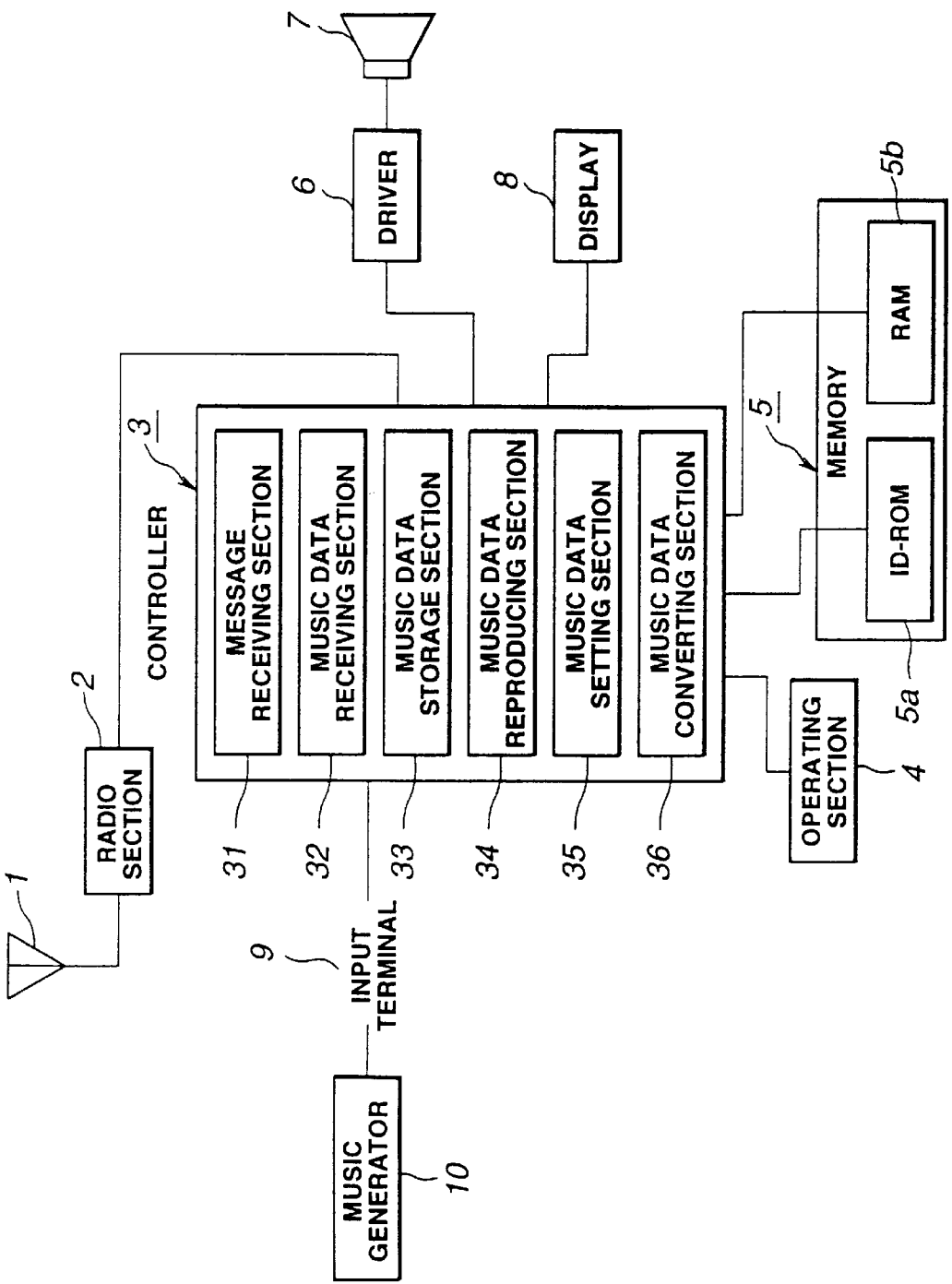

RADIO COMMUNICATION SYSTEM INCLUDING INDEPENDENT CALLING SOUND NOTIFICATION

BACKGROUND OF THE INVENTION

1. Field of the Invention

The present invention relates to a radio communication system which transmits a calling signal consisting of an identification number code and a message code from a calling station to a called station through a base station and, if the identification number in the received calling signal coincides with its identification number, the called station gives calling notification and displays the received message, and a radio communication apparatus which is used as a called station of the radio communication system, and more particularly to improvements in the control of performing calling notification by any selected type of sounds.

2. Description of the Related Art

A selective paging receiver is a known typical example of a radio communication apparatus which receives a paging signal consisting of an identification number code and a message code from a calling station to a called station through a base station and, if the identification number in the received paging signal coincides with its identification number, gives calling notification and displays the received message.

FIG. 10 shows the configuration of a conventional selective paging receiver.

When a calling party wishes to transmit a desired message to the selective paging receiver, he or she performs an operation of inputting this message and the identification number of the selective paging receiver from a telephone set. With this operation, a selective paging signal consisting of the identification number signal and a message code is transmitted from the radio base station in the network to which the telephone set is connected.

When the selective paging receiver receives the selective paging signal transmitted from the base station by means of antenna 1, it transfers this paging signal to controller 3 through radio section 2. Controller 3 compares the identification number code that is appended to the selective paging signal with its identification number that is stored in a memory section 5 and, if these two are the same, generates a paging sound by driving a speaker 7 by means of a driver 6 and informs the called party of the received message in the selective paging signal by displaying it on a display 8.

Regarding the control of the paging sound associated with the selective paging operation, in the conventional selective paging receiver, typically, a ringing sound or melody set by the dealer or manufacturer was stored as a preset sound beforehand in memory section 5 and, on receipt of an incoming call, paging was effected using the preset sound. Consequently, if a plurality of preset sounds are provided, it was possible to freely alter the ringing sound or melody of the paging sound within the range of these preset sounds.

However, in order to alter the ringing sound or melody of the paging sound to a paging sound other than the preset sounds, there was no alternative to replacing the entire memory section 5 or circuit board in which the ringing sound or melody was stored.

As described above, in the conventional selective paging receiver, plural type of preset sounds set by the dealer or manufacturer were stored, and ringing operation to give notification of paging was performed using these preset sounds. Therefore, it was possible to cope with alteration of the ringing sound or melody within the range of these preset sounds. However, in order to alter the ringing sound or melody for paging notification to an arbitrary paging sound other than these preset sounds, there was the problem that there was no alternative to replacing either the circuit board or the entire memory in which these preset sounds were stored.

SUMMARY OF THE INVENTION

In view of the above circumstance, an object of the present invention is to provide a radio communication system and radio communication apparatus wherein this problem is eliminated and the sounds or melody for calling notification can be altered by users without having to replace the circuit board or entire memory in which the preset sounds are stored.

In order to achieve the object and other objects, a radio communication system according to an aspect of the present invention, wherein a calling station transmits a calling signal through a base station, and a called station that has received the calling signal performs calling notification if it determines that the calling signal includes its identification number, comprises transmitting means for adding music data for calling notification to the calling signal and transmitting the calling signal with the addition of the music data; recognition means for recognizing the music data transmitted by the transmitting means; and alerting means for alerting calling notification by using the music data recognized by the recognition means if the called station determines that the calling signal includes its identification number.

The transmitting means may be provided at the calling station and adds the music data which is input in the calling station to message data contained in the calling signal.

The base station may have the transmitting means and add music data which is registered at the base station to message data contained in the calling signal.

The base station may have the recognition means and the alerting means.

According to another aspect of the present invention, a radio communication apparatus that receives a calling signal and alerts calling notification if it determines that the calling signal includes its identification number, comprises determination means for determining whether or not music data for calling notification is contained in the calling signal; and alerting means for alerting calling notification by using the music data if the determination means determines that music data is contained in the calling signal.

The radio communication apparatus may further comprises storage means for storing music data, wherein the alerting means alerts calling notification by using the music data stored by the storage means.

According to still another aspect of the present invention, a radio communication apparatus that receives a calling signal and alerts calling notification if it determines that the calling signal includes its identification number, comprises input means for inputting a music data; conversion means for converting the music data to audio information for calling notification; storage means for storing the audio information converted by the conversion means; and alerting means for alerting calling notification by using the audio information stored by the storage means if it is determined that the calling signal include its identification number.

With a radio communication system according to the present invention, the calling station either effects transmitting with the addition of music data to the message data contained in the calling signal or effects transmitting with the addition of music data registered at the base station to the message data contained in the calling signal, while the called station recognizes the music data appended to the message data and, if it determines that the calling signal includes its identification number, effects calling notification by using the music data that it has recognized. Therefore, the called station can perform calling using the music data transmitted from the calling station without dependence on a preset sound stored beforehand at the station.

With a radio communication apparatus according to the present invention, if the radio communication apparatus determines that a calling signal includes its identification number, it determines whether or not music data for calling notification is included in the calling signal and, if it determines that music data is included in the calling signal, stores this music data and effects calling notification by using the stored music data, so the radio communication apparatus can perform calling using any desired stored music data without dependence on a preset sound stored beforehand.

Also, a radio communication apparatus according to the present invention can input an audio signal and can convert the input audio signal into an audio signal for calling notification which is stored therein. Therefore, if it determines that a calling signal includes its identification number, it can perform calling using any desired stored music data without dependence on a preset sound stored beforehand therein.

BRIEF DESCRIPTION OF THE DRAWINGS

FIGS. 6(a) and 6(b) are views illustrating an example of a message display in reception process by the selective calling receiver according to the first embodiment;

FIG. 8 is a block diagram illustrating the configuration of a selective calling receiver according to a third embodiment of the radio communication apparatus of the present invention;

DESCRIPTION OF PREFERRED EMBODIMENTS

Embodiments of the present invention are described in detail below with reference to the appended drawings.

Figure 1:
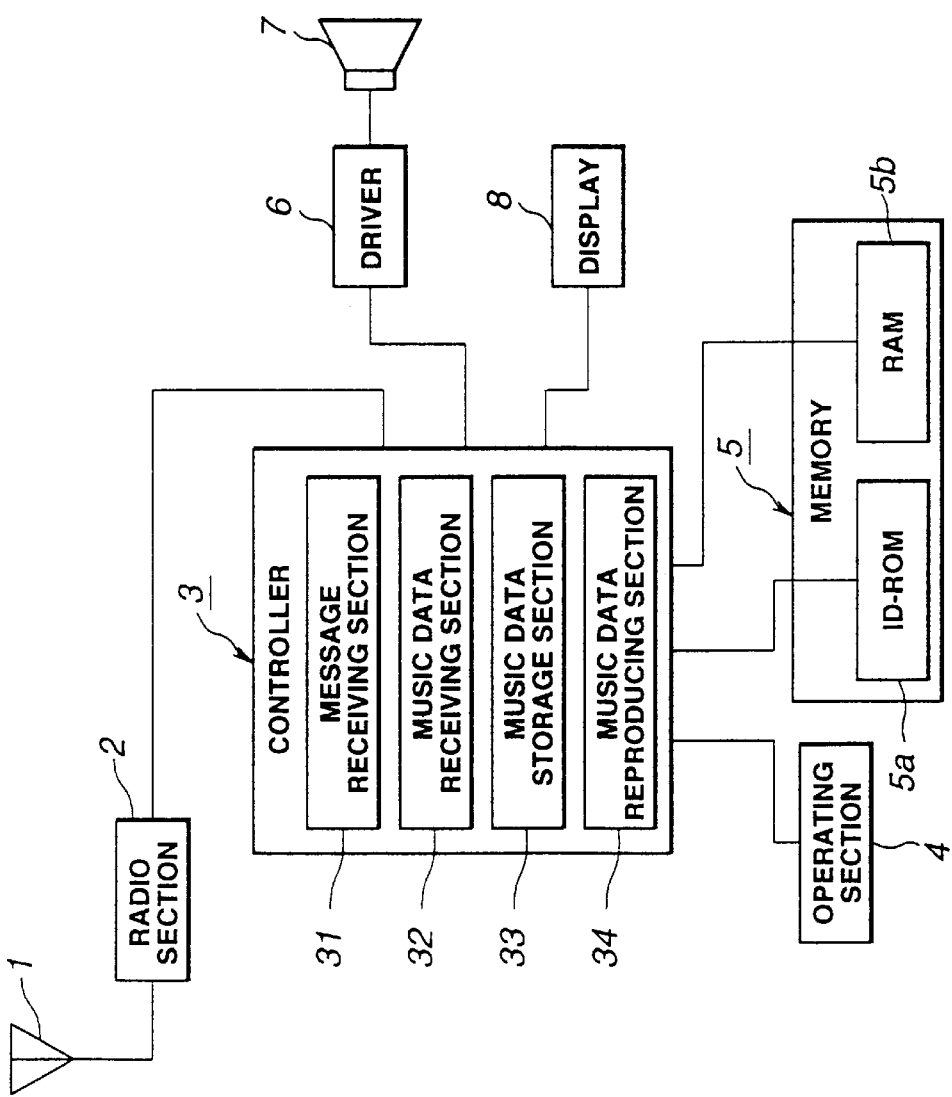
FIG. 1 is a block diagram illustrating the configuration of a selective calling receiver according to a first embodiment of the radio communication apparatus of the present invention.
Figure 10:
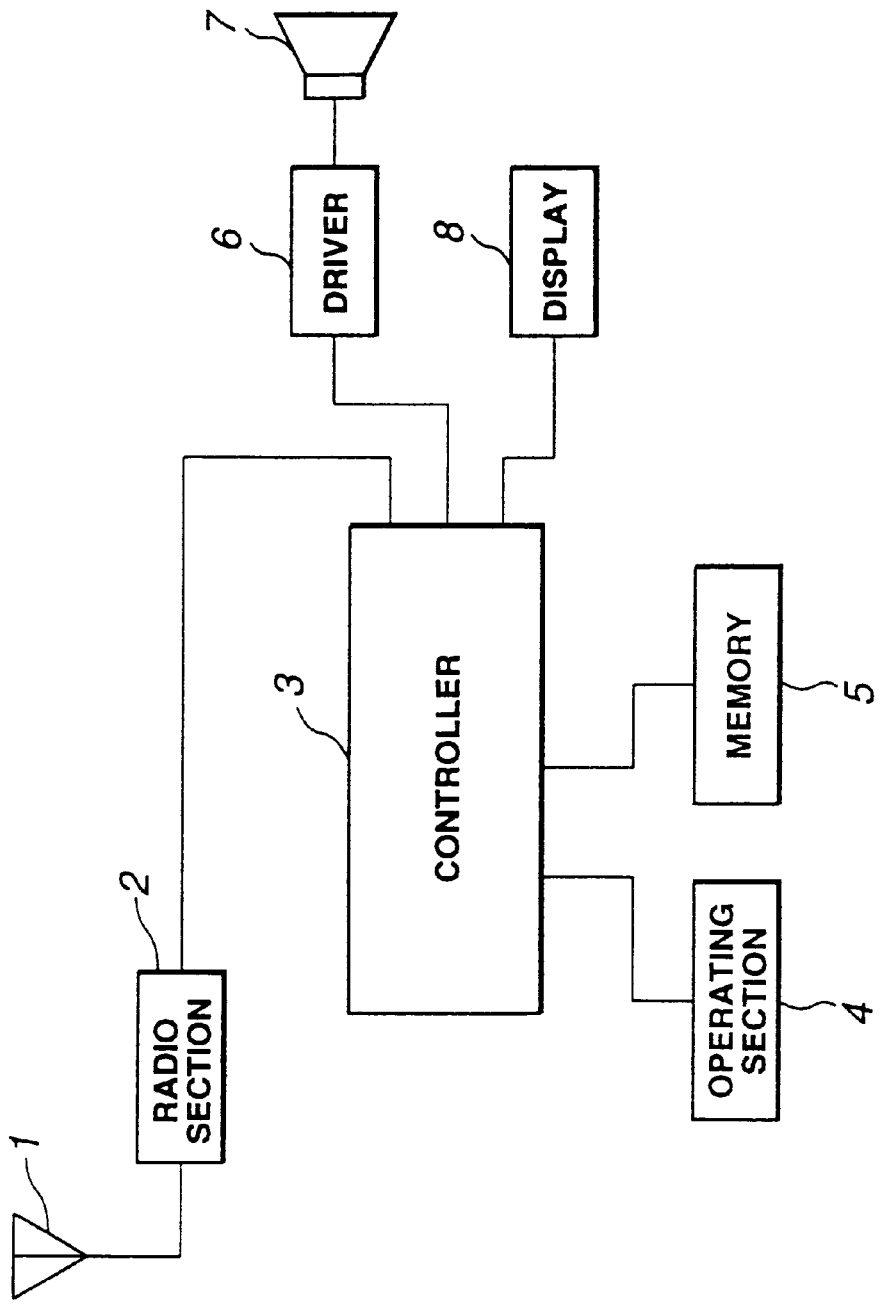
FIG. 10 is a block diagram illustrating the configuration of a prior art selective paging receiver.

FIG. 1 is a block diagram illustrating the configuration of a selective calling receiver according to a first embodiment of the radio communication apparatus of the present invention. Components that have the same function as in the conventional apparatus shown in FIG. 10 are given the same reference numerals as in FIG. 10.

In the selective calling receiver of this embodiment, controller 3 comprises a message receiving section 31 for receiving message code in a selective calling signal; music data receiving section 32 for determining whether or not music data is contained in a message received by message receiving section 31; music data storage section 33 for storing the music data into a music data storage area in RAM 5b of the memory section 5 if the music data receiving section 32 determines that music data is present; and music data reproducing section 34 for performing calling notification by converting the music data to an audio signal if music data receiving section 32 determines that music data is present.

Figure 2:
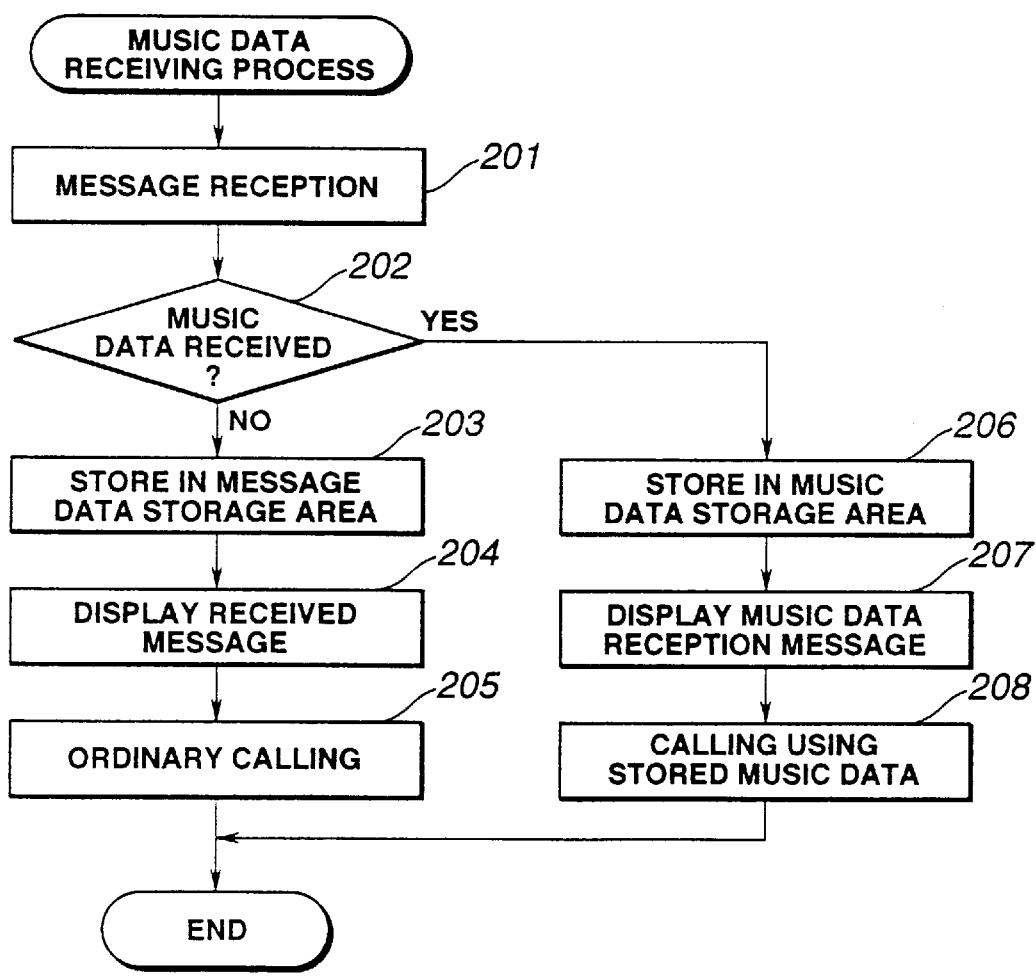
FIG. 2 is a flow chart showing the reception process in a selective calling receiver according to the first embodiment.

The reception process in the selective calling receiver according to the first embodiment of the present invention will be described below with reference to the flow chart shown in FIG. 2.

In calling the selective calling receiver, the call originator, using his telephone set, performs an ordinary calling operation in which he inputs the identification number code of the selective calling receiver of the called party and the message code that is to be transmitted, and in addition, can perform a calling operation of inputting music data after the identification number code and message data. By means of the former call origination operation, a selective calling signal comprising an identification number code and message code is transmitted from the base station; by means of the latter call origination operation, a selective calling signal in which music data is added to the identification number code and message is transmitted. Methods of transmitting the calling signal with music data attached include transmitting a selection instruction from the telephone set to the base station or selecting specified music data from various types of music data stored at the base station and transmitting this attached to the message data.

On the other hand, the selective calling receiver receives the selective calling signal transmitted from the base station by means of antenna 1 and feeds this to message receiving section 31 of controller 3. If the identification number code that is appended to the selective calling signal coincides with the identification number stored in memory section 5, message receiving section 31 receives the received message in the selective calling signal (step 201), and transfers the received message to music data receiving section 32. Music data receiving section 32 determines whether the message data includes music data or not (step 202). If music data is not included (NO in step 202), message receiving section 31 performs calling operation as normal. Specifically, in the calling operation, the received message is stored in a message data storage area in RAM 5b in memory section 5 (step 203); the received message is then subsequently read and displayed by display 8 (step 204) and speaker 7 is driven by driver 6 to perform an operation for calling notification using a preset sound that is stored beforehand in memory section 5 (step 205). FIG. 6(a) shows an example of display of a received message in the ordinary calling operation.

If music data is included (YES in step 202), the music data is stored in a music data storage area in RAM 5b of the memory section 5 (step 206), and a message indicating that music data has been received is displayed by display 8 in a mode as shown in FIG. 6(b) (step 207); a calling sound is then generated using the stored music data (step 208). In more detail, music data reproducing section 34 converts the musical scale codes of the music data stored as above to audio signals of corresponding pitch on the musical scale using the conversion table in FIG. 7(b) and transmits the signals to driver 6; driver 6 uses these audio signals to drive speaker 7, thereby performing the ringing operation for calling notification. At this point, if a message has been received together with the music data, display of the message may be performed.

It should be noted that although the description of the above reception processing was given taking as an example the case where the incoming music data is stored, it would be possible to omit the music data storage section 33 of FIG. 1 and to generate calling sound in real time using the music data directly, without storing it.

Next, a specific example will be described wherein a selective calling signal in which music data has been appended to the message data from the calling party is transmitted, the selective calling information is received by the selective calling receiver, and ringing sound is generated using the music data contained therein.

When, for example, wishing to call a given selective calling receiver with the calling sounds: "do", "re", "mi", "fa", a call originator inputs the identification number code and message code, and then, using the musical scale code conversion table of FIG. 7(b), inputs the numbers "0, 0, 0, 0", "0, 0, 0, 1", "0, 0, 1, 0"and "0, 0, 1, 1" corresponding to the "do", "re", "mi", "fa" mentioned above (musical scale codes).

Figures 7A, 7B:
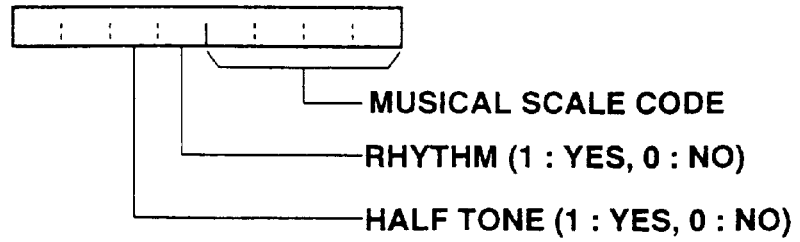
FIGS. 7(a) and 7(b) are views illustrating the information content and transmission format of music data employed by a selected calling receiver according to the present invention.

By the above operations, the music data that is input together with the message in the selective calling signal is transmitted for example by the transmission format shown in FIG. 7(a).

On the other hand, the receiver receives the selective calling signal corresponding to the input operation at the calling party and then, after determining that the identification number in the selective calling signal agrees with its identification number, if the musical scale codes "0000", "0001", "0010", and "0011" are contained in the selective calling signal, converts these musical scale codes to audio signals of corresponding pitch of the musical scale i.e. "do", "re", "mi", "fa", and performs the operation for calling notification using the audio signal.

In this way, a selective calling receiver according to the first embodiment determines whether or not music data is contained in the received message, and, if it is contained, effects calling notification by using this music data rather than a preset sound that was recorded beforehand in the memory. By this means, incoming call calling can be effected using a calling sound that may be freely selected set by the calling party, other than the preset sound determined by the dealer or manufacturer.

Figure 3:
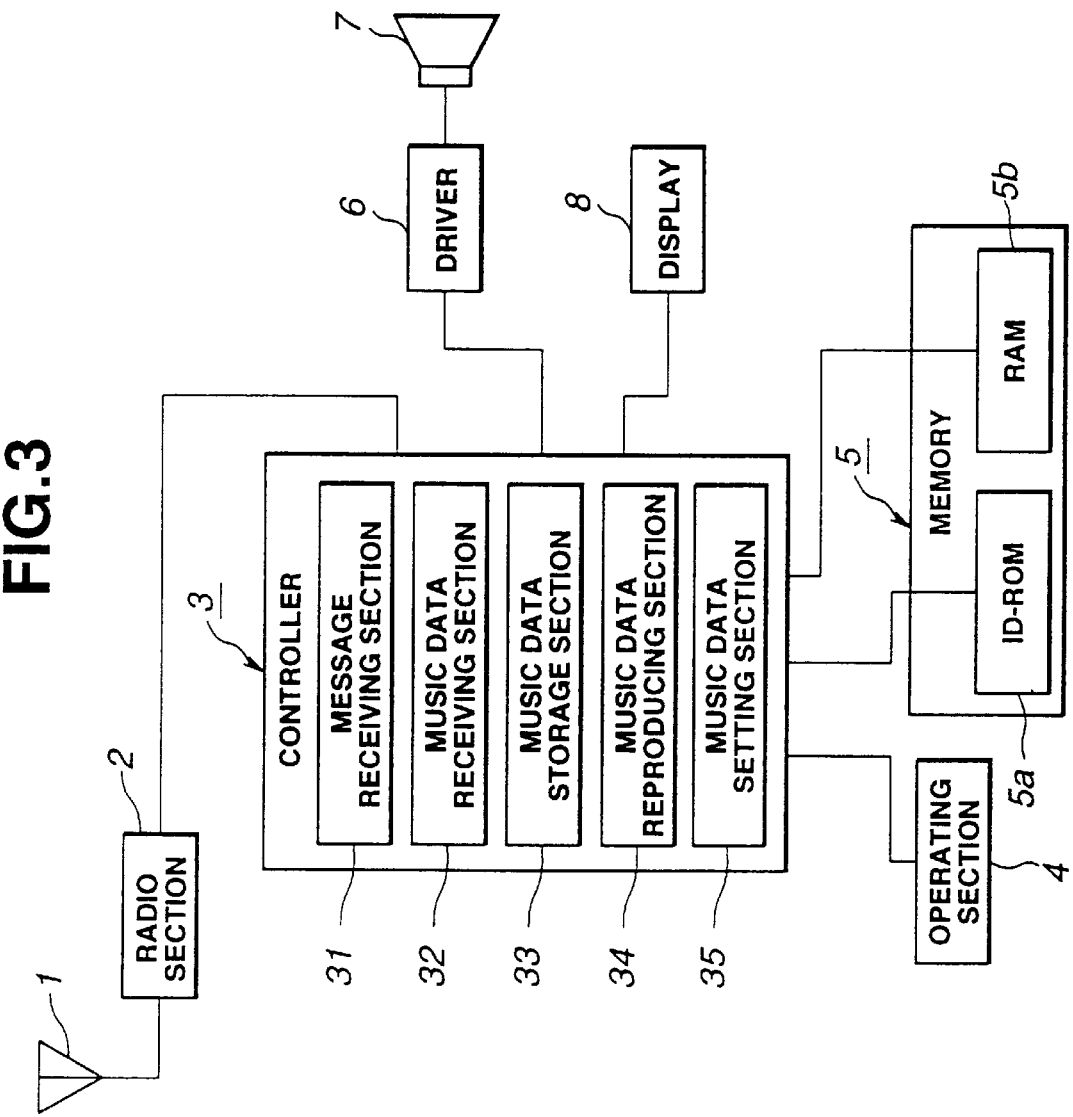
FIG. 3 is a block diagram illustrating the configuration of a selective calling receiver according to a second embodiment of the radio communication apparatus of the present invention.

FIG. 3 is a block diagram illustrating the configuration of a selective calling receiver according to a second embodiment of the radio communication apparatus of the present invention. In the selective calling receiver, in controller 3, in addition to message receiving section 31, music data receiving section 32, music data storage section 33, and music data reproducing section 34, there is provided a music data setting section 35. Message receiving section 31, music data receiving section 32, music data storage section 33 and music data reproducing section 34 perform the same operation as in the first embodiment described above. Music data setting section 35, if a plurality of types of music data are stored within music data storage area in RAM 5b, performs an operation to set which of these types of music data is to be selected.

Figure 4:
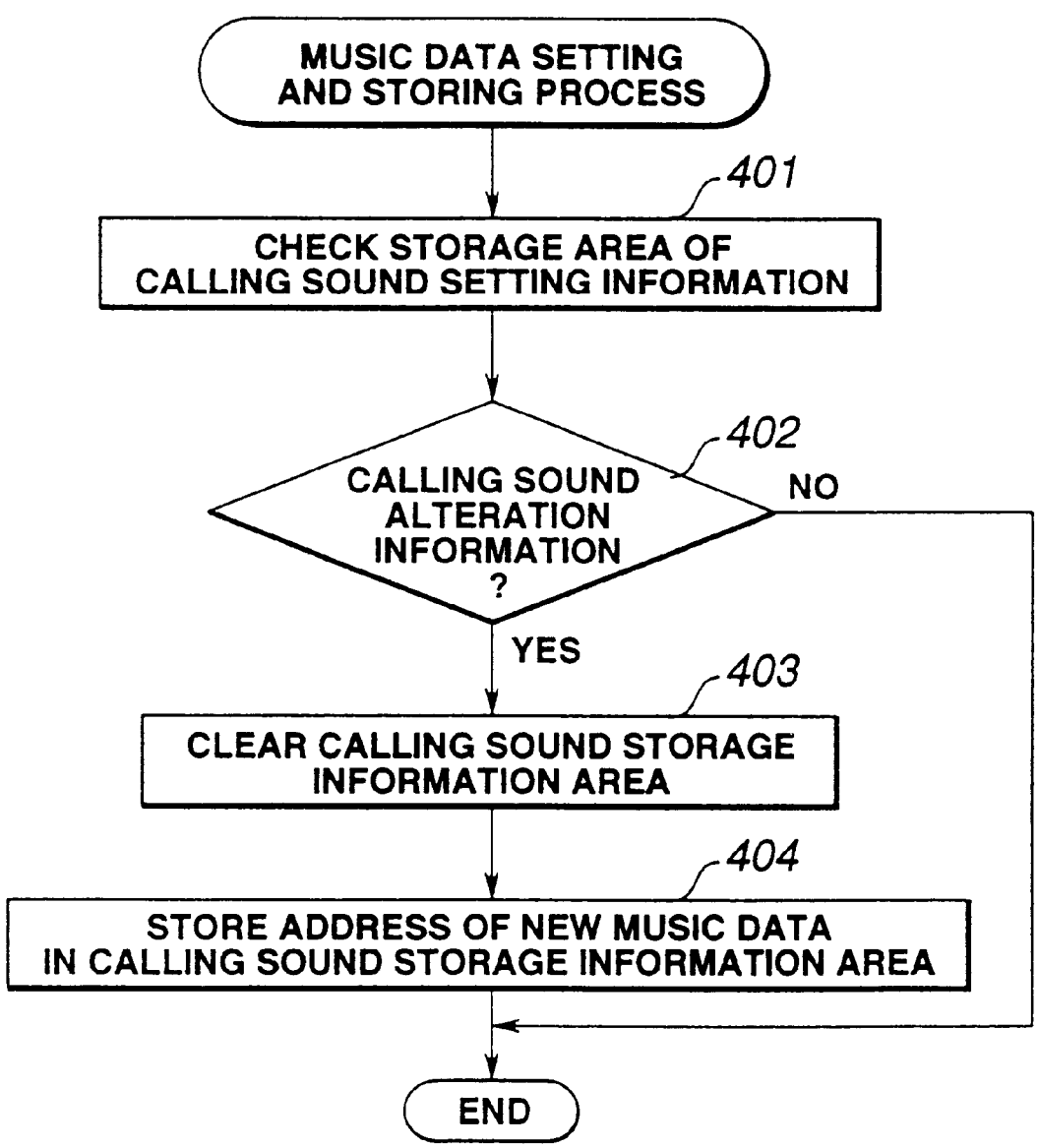
FIG. 4 is a flow chart illustrating the music data set-up and storage process in a selective calling receiver according to the second embodiment.

The music data setting and storing process in the selective calling receiver according to the second embodiment will now be described with reference to the flow chart in FIG. 4.

Let us now assume that, when music data of a plurality of different types are present within music data storage area in RAM 5b in the selective calling receiver, there is a need to perform ringing operation for calling notification using a desired type of music data therein. The user can achieve this by for example inputting alteration information indicating that alteration is to be performed and then performing an operation to input the address of the music data that is required to be altered. By the input of the alteration information, for example, in a calling sound setting information storage area of music data storage section 33, there is stored information indicating "perform alteration", and, in a calling sound storage information area, there is stored the address of the music data. In response to the input operation, music data setting section 35 checks the calling sound setting information storage area in music data storage section 33 (step 401), and decides whether information that it contains is or is not calling sound alteration information indicating that the calling sound is to be altered (step 402); if this is not calling sound alteration information (NO in step 402), processing thereupon terminates. If information is calling sound alteration information (YES in step 402), the calling sound storage information area is cleared (step 403), and the address of the new music data is stored in the calling sound storage information area in music data storage section 33 (step 404).

Figure 5:
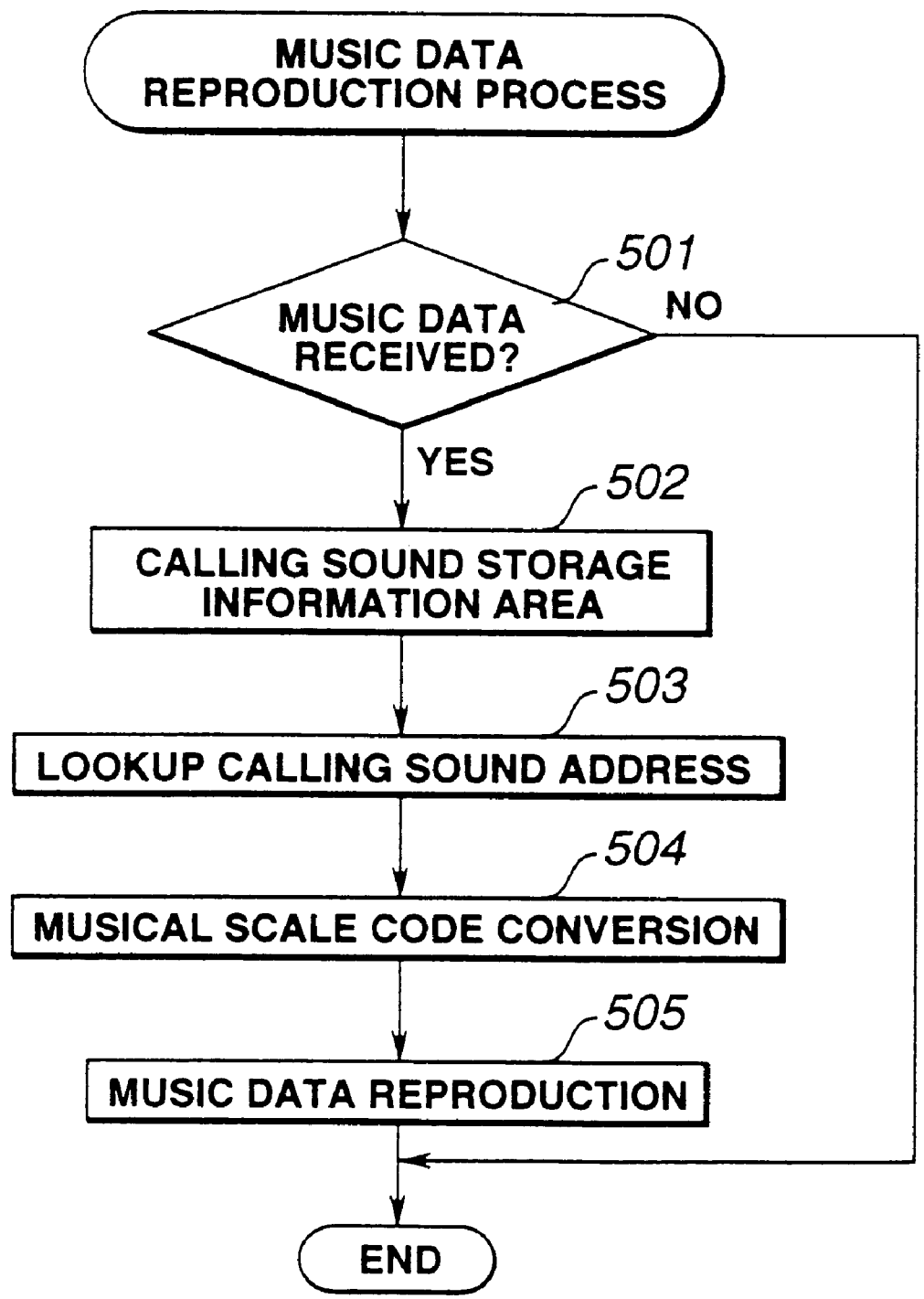
FIG. 5 is a flow chart showing the music data reproduction process in a selective calling receiver according to the second embodiment.

If, in the above condition, a selective calling signal is received, the reproduction of music data is performed in accordance with the flow chart shown in FIG. 5.

Specifically, controller 3 ascertains whether or not reception has taken place (step 501); if reception has not taken place (NO in step 501), processing terminates at this point. If reception has taken place (YES in step 501), music data receiving section 32 accesses the calling sound storage information area in music data storage section 33 (step 502), and looks up the calling sound address (step 503) and reads the music data stored in the calling sound address; the music data is then converted to a musical scale code by music data reproducing section 34 (step 504), and reproduced as the calling sound (step 505).

In this way, with a selective calling receiver according to the second embodiment, it is possible to set which type of the music data of a plurality of types stored in the music data storage area of RAM 5b is to be employed and, when a selective calling signal is received, to perform ringing operation for calling notification using the music data in the aforesaid setting rather than a preset sound previously stored in the memory.

FIG. 8 shows the configuration of a selective calling receiver according to a third embodiment of the radio communication apparatus of the present invention. In the selective calling receiver, a music generator 10 is connected as an external device. A CD player etc. could be used as an example of the music generator. To enable use of the music generator 10, the selective calling receiver according to the third embodiment is provided with an input terminal 9 and within controller 3 there are provided, in addition to message receiving section 31, music data receiving section 32, music data storage section 33, music data reproducing section 34, music data setting section 35, and a music data converting section 36. Message receiving section 31, music data receiving section 32, music data storage section 33, music data reproducing section 34, and music data setting section 35 perform the same operation as in the first and second embodiments. Music data converting section 36 performs the operations of reading audio signals reproduced from music generator 10 through input terminal 9 and converting these to musical scale codes.

Figure 9:
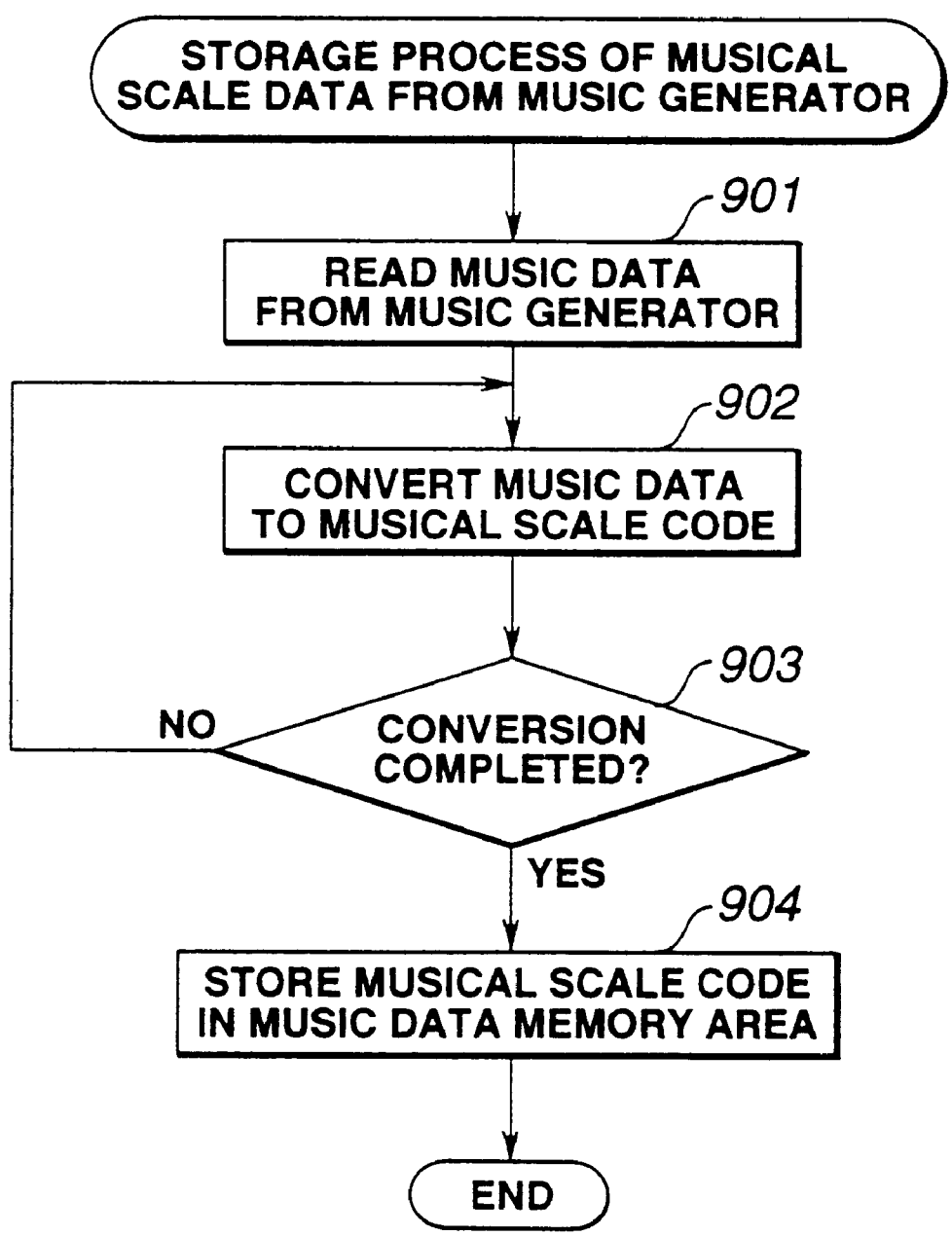
FIG. 9 is a flow chart illustrating the process of music data storage from a music generating apparatus in a selective calling receiver according to the third embodiment of the radio communication apparatus of the present invention.

Music data storage process based on the reproduced sound from the music generator in a selective calling receiver according to the third embodiment is described below with reference to the flow chart shown in FIG. 9.

Music generator 10, as shown in FIG. 8, is connected to the selective calling receiver through input terminal 9. In this condition, an audio signal is reproduced from music generator 10 and the audio signal is read at the selective calling receiver end through input terminal 9 (step 901). Next, music data converting section 36 converts the audio signal to the corresponding musical scale codes using the conversion table shown in FIG. 7(b) (step 902), and, after conversion of all the audio signals has been completed (YES in step 903), stores the musical scale codes in the music data storage area in RAM 5b (step 904).

After the music data storage process have been completed, if a selective calling signal has been received by the selective calling receiver, an audio signal is generated by driver 6 using the music data stored in the form of musical scale codes in the music data storage area in RAM 5b and is used to drive speaker 7, thereby performing ringing operation for calling notification.

As described above, with the selective calling receiver according to the third embodiment, a music generator 10 is connected, an audio signal generated from the music generator 10 is read, is converted to a musical scale code and is stored; by this means, when a selective calling signal is received, ringing operation for calling notification can be performed using the musical scale code instead of a preset sound stored beforehand in the memory section 5.

Although in all the above embodiments, examples of application to a selective calling receiver were illustrated, the present invention is not restricted to these embodiment and could be applied generally to radio communication apparatus wherein a calling signal comprising an identification number code and a message code is received and if the identification number coincides with its identification number, operation to effect calling notification and operation to effect message display are performed.

What is claimed is:

1. A radio communication system wherein a calling station transmits a calling signal through a base station, and a called station that has received the calling signal performs calling notification if the calling signal is addressed to the called station, wherein the called station comprises:

determination means for determining whether or not calling notification sound data including a train of a plurality of scale codes that are arranged to represent a specific melody and usable for a calling notification sound is added to the calling signal at the reception of the calling signal if the calling signal is addressed to the called station; and calling notifying means for generating a calling sound based on the calling notification sound data if the determination means determines that the calling notification sound data is added to the calling signal, and generating a calling sound preset to the called station if the determination means determines that the calling notification sound data is not added to the calling signal.

2. The radio communication system according to claim 1, wherein the called station further comprises transmitting means for adding the calling notification sound data to message data contained in the calling signal and transmitting the calling signal to the called station through the base station.

3. The radio communication system according to claim 1, wherein the called station further comprises:

registration means for registering the calling notification sound data therein; and transmitting means for adding the calling notification sound data registered in the registration means to message data contained in the calling signal, and transmitting the calling notification sound data thus added to the called station through the base station.

4. The radio communication system according to claim 1, wherein the calling notifying means comprises:

storage means for storing the calling notification sound data; and reproducing means for converting the calling notification sound data stored in the storage means into a calling sound corresponding to the calling notification sound data so as to reproduce the calling sound.

5. A radio communication system wherein a calling station transmits a calling signal through a base station, and a called station that has received the calling signal performs calling notification if the calling signal is addressed to the called station, wherein the called station comprises:

storage means for converting a voice signal input from outside into calling notification sound data including a train of a plurality of scale codes that are arranged to represent a specific melody and usable for a calling notification sound, and storing the calling notification sound therein; and calling notifying means for generating a calling sound based on the calling notification sound data stored in the storage means at the reception of the calling signal if the calling signal is addressed to the called station.

6. A radio communication apparatus that receives a calling signal and performs calling notification if the calling signal is addressed to the radio communication apparatus, comprising:

receiving means for receiving the calling signal;

determination means for determining whether or not calling notification sound data including a train of a plurality of scale codes that are arranged to represent a specific melody and usable for a calling notification sound is added to the calling signal if the calling signal received by the receiving means is addressed to the radio communication apparatus; and calling notifying means for generating a calling sound based on the calling notification sound data if the determination means determines that the calling notification sound data is added to the calling signal, and generating a calling sound preset to the radio communication apparatus if the determination means determines that the calling notification sound data is not added to the calling signal.

7. The radio communication system according to claim 6, wherein the calling notifying means comprises:

storage means for storing the calling notification sound data; and reproducing means for converting the calling notification sound data stored in the storage means into a calling sound corresponding to the calling notification sound data so as to reproduce the calling sound.

8. A radio communication apparatus that receives calling signal and performs calling notification if the calling signal is addressed to the radio communication apparatus, comprising:

input means for inputting a voice signal from outside;

converting means for converting the voice signal input from the input means into calling notification sound data including a train of a plurality of scale codes that are arranged to represent a specific melody and usable for calling notification sound;

storage means for storing the calling notification sound data produced by the converting means; and calling notifying means for generating a calling sound based on the calling notification sound data stored in the storage means at the reception of the calling signal if the calling signal is addressed to the called station.

9. A radio communication system wherein a calling station transmits a calling signal through a base station, and a called station that has received the calling signal performs calling notification if the calling signal is addressed to the called station, wherein the called station comprises:

determination means for determining whether or not calling notification sound data including a train of a plurality of scale codes that are arranged to represent a specific melody and usable for a calling notification sound is added to the calling signal at the reception of the calling signal if the calling signal is addressed to the called station;

storage means for storing the calling notification sound data; and storage control means for controlling the storage means so that the storage means stores the calling notification sound data if the determination means determines that the calling notification sound data is added to the calling signal.

10. A radio communication apparatus that receives a calling signal and performs calling notification if the calling signal is addressed to the radio communication apparatus, comprising:

receiving means for receiving the calling signal;

determination means for determining whether or not calling notification sound data including a train of a plurality of scale codes that are arranged to represent a specific melody and usable for a calling notification sound is added to the calling signal if the calling signal received by the receiving means is addressed to the radio communication apparatus;

storage means for storing the calling notification sound data; and storage control means for controlling the storage means so that the storage means stores the calling notification sound data if the determination means determines that the calling notification sound data is added to the calling signal.

* * * * *